United States Patent
Rossi

(10) Patent No.: US 11,233,783 B2
(45) Date of Patent: Jan. 25, 2022

(54) AUTHENTICATION IN A COMPUTER NETWORK SYSTEM

(71) Applicant: SSH Communications Security OYJ, Helsinki (FI)

(72) Inventor: Markku Rossi, Järvenpää (FI)

(73) Assignee: SSH Communications Security OYJ, Helsinki (FI)

(*) Notice: Subject to any disclaimer, the term of this patent is extended or adjusted under 35 U.S.C. 154(b) by 379 days.

(21) Appl. No.: 16/363,673

(22) Filed: Mar. 25, 2019

(65) Prior Publication Data
US 2019/0297073 A1  Sep. 26, 2019

(30) Foreign Application Priority Data
Mar. 26, 2018 (GB) .................................. 1804826

(51) Int. Cl.
*H04L 29/06* (2006.01)

(52) U.S. Cl.
CPC ...... *H04L 63/0823* (2013.01); *H04L 63/0815* (2013.01); *H04L 63/105* (2013.01); *H04L 63/108* (2013.01)

(58) Field of Classification Search
CPC ............. H04L 63/0823; H04L 63/0815; H04L 63/105; H04L 63/108
See application file for complete search history.

(56) References Cited

U.S. PATENT DOCUMENTS

| | | | | |
|---|---|---|---|---|
| 8,873,752 | B1* | 10/2014 | Machiraju | H04L 63/0428 380/247 |
| 2004/0268152 | A1* | 12/2004 | Xia | H04L 63/0281 726/5 |
| 2005/0255829 | A1* | 11/2005 | Kirkup | H04L 51/38 455/410 |
| 2007/0101418 | A1* | 5/2007 | Wood | H04L 63/105 726/8 |

(Continued)

FOREIGN PATENT DOCUMENTS

| | | |
|---|---|---|
| JP | 2005-065274 A | 3/2005 |
| JP | 2005065247 A | 3/2005 |

(Continued)

OTHER PUBLICATIONS

Shingo Orihara et al., Certificate-less User Authentication with Consent, Nov. 2007, ACM, pp. 11-16. (Year: 2007).*

(Continued)

*Primary Examiner* — Luu T Pham
*Assistant Examiner* — Fahimeh Mohammadi
(74) *Attorney, Agent, or Firm* — Ziegler IP Law Group, LLC

(57) ABSTRACT

Methods and apparatuses for authentication in a computer network system based on security credentials issued for client hosts by a remote security authority are disclosed. In response to detection that a client host is prevented from obtaining security credentials from the remote security authority for use in accessing a target host, the client host can obtain an emergency security credential from a storage (Continued)

of emergency security credentials. The emergency security credential with an error state indication can be send from the client host to the target host for use in the authentication.

12 Claims, 10 Drawing Sheets

(56) References Cited

U.S. PATENT DOCUMENTS

| | | | |
|---|---|---|---|
| 2009/0083540 A1* | 3/2009 | Kim | H04N 21/4627 713/156 |
| 2009/0132813 A1* | 5/2009 | Schibuk | G06Q 20/322 713/158 |
| 2009/0144540 A1* | 6/2009 | Davis | H04W 12/082 713/156 |
| 2009/0217364 A1* | 8/2009 | Salmela | H04L 69/40 726/6 |
| 2010/0242102 A1* | 9/2010 | Cross | G06F 21/32 726/7 |
| 2012/0290868 A1* | 11/2012 | Gladwin | G06F 11/076 714/4.1 |
| 2014/0222604 A1* | 8/2014 | Yellapragada | G06Q 30/0601 705/26.1 |
| 2014/0273965 A1* | 9/2014 | Raleigh | H04L 63/08 455/411 |
| 2014/0282916 A1* | 9/2014 | Gast | H04W 12/37 726/4 |
| 2016/0218875 A1* | 7/2016 | Le Saint | H04L 9/0841 |
| 2017/0034284 A1* | 2/2017 | Smith | H04L 9/3297 |

FOREIGN PATENT DOCUMENTS

| | | |
|---|---|---|
| JP | 2005065247 A | 3/2015 |
| WO | 2015016940 A1 | 2/2015 |
| WO | 2017/053989 A1 | 3/2017 |
| WO | 2017053989 A1 | 3/2017 |
| WO | 2018/004935 A1 | 1/2018 |
| WO | 2018004935 A1 | 1/2018 |

OTHER PUBLICATIONS

Hamdi Abdurhman Ahmed et al., Document Certificate Authentication System Using Digitally Signed QR Code Tag, Jan. 2018, ACM, pp. 1-5. (Year: 2018).*
Cheng-Chi Lee et al., Security Enhancement on a New Authentication Scheme With Anonymity for Wireless Environments, Jun. 28, 2004, IEEE, vol. 50, Issue: 1, pp. 231-235. (Year: 2004).*
Sunyanan Choochotkaew et al., Development of a Trustworthy Authentication System in Mobile Ad-Hoc Networks for disaster area, May 14-17, 2014, IEEE, pp. 1-6. (Year: 2014).*
Hembroff, Guy C. et al. "Secure Access for Medical Smart cards over Networks" published in World of Wireless Mobile and Multimedia Networks (WOWMOM), 2010, IEEE International Symposium on a IEEE, Piscataway, New Jersy, USA, 6 pages.
Extended European Search Report issued in EP Application No. EP19160948.6 dated Jan. 14, 2020, 14 pages.
GB Intellectual Property Office, Search Report under Section 17(5), Application No. GB1804826.4, dated Aug. 23, 2018, 3 pages.
Guy C. Hembroff et al., "Samson: Secure Access for Medical Smart cards over networks", IEEE International symposium on a World of Wireless Mobile and Multimedia Network (WOWMOM), Jun. 14, 2010, 1-6 pages.
Partial European Search Report issued in EP Application No. EP19160948.6, dated Sep. 30, 2019, 18 pages.

* cited by examiner

AUTHENTICATION IN A COMPUTER NETWORK SYSTEM

FIELD

This disclosure relates to authentication in a computer network system and more particularly to arrangements where authentication of client hosts to a target hosts is based on security credentials issued by a security credential authority.

BACKGROUND

A computer network system enables computing devices such as user equipment, servers, machine type devices and other data processing equipment to communicate data. Physical data processing devices are often called hosts. A host can also be provided in a virtualized environment, for example comprise a virtual machine (VM) or a container. A more particular example of a container is a Linux™ container or equivalent.

A client host may need to access a target host via the computer network system for various reasons. Access to a host in a computer network system can be configured in various manners. Non-limiting examples of access systems include web-based access, security protocol (e.g. Secure Shell protocol; SSH) based access, file transfer access, remote procedure call access, and/or software upgrade access. Regardless of the access method security can become a concern, and various solutions for enhancing data security have been suggested. According to a solution a client host an authentication procedure is performed between an accessing client host and a target host. The authentication can be based on security credentials issued by a security credential authority, typically secure server apparatus operated by a trusted party. An example of such security credentials include security certificates issued by a certificate authority (CA) server.

The issued security credentials may be configured to have only a limited lifetime. The lifetime can be relatively short, e.g., just long enough to enable the authentication procedure to run its cycle. The lifetime can also be limited so that a security credential can be used only once, or only for a limited number of accesses. Use of a security credential may also be limited in other ways. Thus a client host may need to request from the security credential authority for a new security credential each time, or relatively frequently, when it wants to access a target host.

A problematic situation may occur if a client host cannot obtain security credentials from a security credential authority server when the security credential would be needed for access. For example, an error condition may prevent the client host from obtaining the needed credential. Common error conditions comprise link error and server failure but there are many other reasons why the credential delivery arrangement may not be working properly. This may be particularly problematic in applications where automated access is needed. Examples of such scenarios comprise Internet of Things (IoT) applications and other machine to machine type communications.

It is noted that the above discussed issues are not limited to any particular communication protocol and data processing apparatus but may occur in any computerised system where security credential by a credential issuing authority are used to authenticate an accessing party.

SUMMARY

In accordance with an aspect there is provided a method for authentication in a computer network system based on security credentials issued for client hosts by a remote security authority, the method comprising: detecting that a client host is prevented from obtaining security credentials from the remote security authority for use in accessing a target host, in response to said detecting, obtaining by the client host an emergency security credential from a storage of emergency security credentials, and sending the emergency security credential with an error state indication from the client host to the target host.

According to a more detailed aspect the emergency security credential including the error state indication is received from the remote security authority and storing the received emergency security credential at the client host or by the host to an external storage.

Upon receipt of the emergency security credential from the security authority, the client hoist can store received emergency security credential in the storage for use later in response to detection that the client host is prevented from obtaining security credentials from the remote security authority. When a procedure to obtain a security credential from the security authority for use in accessing the target host is initiated, it may be determined that security credentials cannot be obtained from the remote security authority. The stored emergency security credential from the storage for sending to the target host in response to the detection.

According to another aspect there is provided a method for authenticating access to a target host in a computer network based on security credentials issued for a client host by a security authority, the method comprising: receiving at the target host from the client host an emergency security credential in association with a request for access, detecting an error indication in association with the received emergency credential indicative that the client host is prevented from obtaining a security credential from the remote security authority for use in accessing the target host, and in response to said detecting, performing at least one additional security operation in association with processing the request for access based on the emergency security credential.

According to a more detailed aspect, the at least one additional security operation comprises at least one of requesting for password authentication, requesting for two factor authentication, additional auditing of the access request, limiting the operations allowed for the client host in response to the access request, causing sending an alert message, and checking the status of the security authority.

According to an aspect there is provided a method for issuing security credentials by a security credential server for access authentication in a computer network, comprising: creating an emergency security credential for use by a client host in accessing a target host when the client host cannot obtain a security credential from the security credential server, wherein the emergency security credential is configured to provide an error state indication, and sending the emergency security credential to the client host for storing in a storage of emergency security credentials.

According to an aspect there is provided an authentication credential issued by a security authority for use by a client host for accessing a target host in a data communication system, the authentication credential comprising at least one security feature for use in an authentication procedure between the client host and the target hosts, and an indication that the security credential is an emergency security credential used in response to detection of an error situation preventing the client host from obtaining a security credential from the security authority.

The authentication credential may comprise an emergency security certificate issued by a certificate authority server.

According to an aspect there is provided a data processing apparatus for a client host use for authentication in a computer network system based on security credentials issued by a remote security authority, the data processing apparatus comprising at least one processor, and at least one memory including computer program code, wherein the at least one memory and the computer program code are configured, with the at least one processor, to cause the client host to: detect that the client host is prevented from obtaining security credentials from the remote security authority for use in accessing a target host, in response to said detecting, obtain an emergency security credential from a storage of emergency security credentials, and send the emergency security credential with an error state indication to the target host.

The apparatus can be configured to receive the emergency security credential provided with the error state indication from the remote security authority and store the received emergency security credential at the client host, or to an external storage. The emergency security credential may be stored in a storage that is accessible only by holders of privileged access rights.

The apparatus according may be configured to process emergency security certificates issued by a certificate authority server.

The apparatus may be configured to receive the emergency security credential from the security authority, store the received emergency security credential in the storage for use later in response to detecting that the client host is prevented from obtaining security credentials from the remote security authority, initiate a procedure to obtain a security credential from the security authority for use in accessing the target host and subsequently determine that security credentials cannot be obtained from the remote security authority, and fetch the stored emergency security credential from the storage for sending to the target host.

According to an aspect there is provided a data processing apparatus for a target host for use in authentication of clients hosts in a computer network system based on security credentials issued by a remote security authority, the data processing apparatus comprising at least one processor, and at least one memory including computer program code, wherein the at least one memory and the computer program code are configured, with the at least one processor, to cause the target host to: receive from a client host an emergency security credential in association with a request for access, detect an error indication associated with the received emergency credential indicative that the client host is prevented from obtaining a security credential from the remote security authority for use in accessing the target host, and in response to said detecting, perform at least one additional security operation in association with processing the request for access based on the emergency security credential.

The apparatus may be configured to, in response to detection of the error indication, at least one of: request for password authentication, request for two factor authentication, cause auditing of the access request, limit operations allowed for the client host in response to the access request, cause sending an alert message, and check the status of the security authority.

According to an aspect there is provided a data processing apparatus for a security credential authority apparatus for use in issuing security credentials for authentication of clients hosts in a computer network system, the data processing apparatus comprising at least one processor, and at least one memory including computer program code, wherein the at least one memory and the computer program code are configured, with the at least one processor, to cause the security credential authority apparatus to: create an emergency security credential for use by a client host in accessing a target host when the client host cannot obtain a security credential from the security credential server, wherein the emergency security credential is configured to comprise an error state indication, and send the emergency security credential to the client host for storing in a storage of emergency security credentials.

The stored emergency security credential can be periodically renewed, a new emergency security credential can be delivered to the client host in response to a request from the client host, and/or a new emergency security credential can be sent to the client host together with a normal security credential, in the course of normal security credential delivery operation.

The certificate authority may be configured to respond enquiries originating from the target host regarding use of the emergency security credential.

The emergency security credential may comprise a security certificate issued by a certificate authority server. At least one of the security certificate and the emergency security certificate comprises an ephemeral security certificate.

The emergency security credential may be used for authentication of machine-to-machine communications.

A computer readable media comprising program code for causing a processor to perform instructions for authentication processes in data processing apparatus as described herein may also be provided.

Certain more detailed aspects are evident from the detailed description.

BRIEF DESCRIPTION OF DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures

DESCRIPTION OF EXAMPLES

Figure 1:
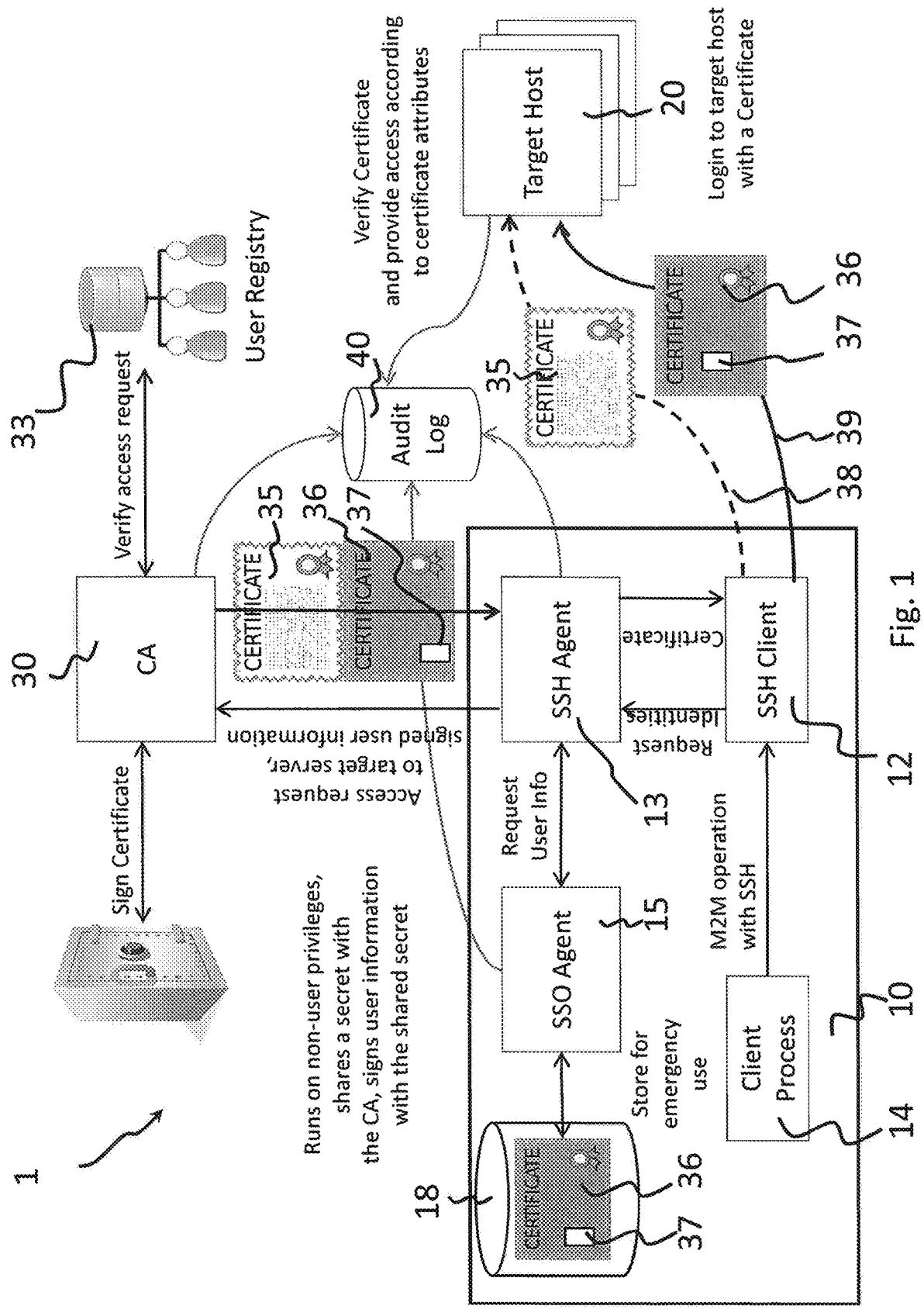
FIG. 1 illustrates an example of a computer network arrangement where certain aspects of the invention can be embodied.

FIG. 1 shows an example of an architecture for a data network system 1 where some of the herein described examples may be embodied. A data network system can comprise, for example, an Intranet of an enterprise or another organization, or a broader public network such as the Internet enabling communications between various devices connected thereto The network system may comprise one or more data networks. The data network system can be e.g. an IPv4 (Internet Protocol version 4) or IPv6 (Internet Protocol version 6) based network system. Communications in the network system can be secured based on an appropriate security protocol. For example, secure shell (SSH) protocol, secure sockets layer (SSL) protocol, transport layer security (TLS) protocol or the like may be used.

The example of FIG. 1 illustrates an example of authenticating communications between a client host 10 and target host 20. Control apparatus of the client host 10 may comprise an authentication component configured to authenticate a request for access to the target host 20. The authentication procedure can involve sending a further request for a security credential to a security credential issuing device in association with the request for access. In this description the term target host refers to a data processing entity which can be accessed by the client host 10. In the non-limiting example of FIG. 1 the target host 20 can comprise a target server running secure shell (SSH) protocol server. The accessed target host 20 can provide a wide variety of services and functionalities for the client via the network. A host may be provided, e.g., by a server, a user device, a machine type device, or another physical data processing entity. A host may also be provided in virtual environment based on cloud computing.

More particularly, FIG. 1 shows an example computer network system 1 where the client host 10 can request for access to the target host 20 using security credentials issued by a security credential authority 30 for use in authentication of the client host. In the example the the credentials provided by the security credential authority are shown to comprise two different types of certificates 35, 36. The security server device of the authority providing the certificates is shown to comprise a certificate authority (CA) server. Control apparatus of the client host 10 can be configured to request for certificates from the CA when needed.

The security credential authority apparatus 30 may comprise an authentication and authorization server issuing short-lived certificates for SSH client programs. The server can be operated by a trusted party or organisation, e.g., a company that charges customers to issue certificates for them. In a web of a trust scheme, the signer can be, e.g., an owner of a key (a self-signed certificate) or other users ("endorsements") whom the person examining the certificate might know and trust.

An access handling module of a client host can be arranged to handle access requests based on trusted security credentials issued by a credential issuing server after an authentication procedure. The authentication procedure can be based on exchange of at least one authenticator, for example based on an authentication procedure involving use of public and private keys or symmetric keys. Keys can be used, e.g., for encryption of data communicated between devices and/or encryption of stored data. In addition to cryptography, keys can also be used for the actual authentication and/or authorisation functions, digital signatures and so on. Public and secret keys can be used. In public key cryptography, or asymmetric cryptography, a pair of public and private keys is used. The public keys may be disseminated widely whereas the private keys are known only to the owner. This accomplishes the authentication (the public key is used to verify that a holder of the paired private key sent the message) and encryption (only the holder of the paired private key can decrypt the message encrypted with the public key). Certificates can be used to verify or sign the keys. A public key certificate can be used to prove the ownership of a public key. A public key certificate is an electronic document, also known as a digital certificate or identity certificate that includes information about the key, information about the identity of the proprietor of the key, and the digital signature of an entity that has verified that the contents of the certificate are correct. The principle is that if the signature is valid, and the person examining the certificate trusts the signer, then that key can be used to securely communicate with its proprietor. Certificates signed by a certificate authority (CA) are considered to provide a good defence in preventing an attacker from impersonating a secure website or other server.

A security credential authority server such as the CA server 30 can be arranged to communicate with a system of record 33 to authenticate users and get additional information, for example group information. The CA server can further implement policy decisions. A policy decision can include, inter alia, how users are authenticated, how user groups map to principals, and which options and extensions are included in a credential such as a certificate. The system of record 33 can provide an authoritative user information registry. The system of record can be arranged to provide an authoritative source of user information and system policy definitions. On customer environments this can be e.g. an Active Directory; a Lightweight Directory Access Protocol (LDAP) directory/OpenLDAP directory holding users and groups (principals). Users can be uniquely identifiable by the system of record. Other user attributes can also be used to identify a user during the authentication flow.

The credential information can comprise a certificate 35 issued by a certificate authority 30. Credential information associated with the credential may also comprise at least one use restriction on a credential such as a certificate. For example, the credential information can comprise a lifetime limitation of a credential. By setting a limited lifetime the system can be configured to provide an ephemeral access arrangement. For example, an ephemeral certificate may be issued that is only valid for a short period of time, e.g., 2 minutes. A short lifetime, such as a lifetime of only a few minutes can be used to reduce and prevent security risks caused by compromised security certificates. The credential information may also comprise other limitations, such as a limitation on the number of times a credential can be used. Other limitations, such as geographical limitations allowing and/or disallowing use in certain locations can also be set on the credentials. Geographical location of the user device may be determined e.g. based on a positioning system of the device such as smartphone. If a client host, or target host, is a mobile device it can move to another location, and differently limited credentials may need to be requested. Other examples of limitations that may change include limitations based on the IP address of the hosts, date and/or time of access, type of service requested and so on.

In FIG. 1 example the client host 10 or at least some components thereof may be arranged to operate enable secured communications according to the SSH protocol. The data processing apparatus of the client host can be configured to have an agent function to request for credential information using authenticators such as public and private keys from the credential management server apparatus 30. The agent entity may comprise e.g. a Secure Shell (SSH) agent entity 13. The agent entity may be configured to create an ephemeral keypair, or use another ephemeral authenticator arrangement, for obtaining credential information from the credential manager 30. The agent entity may also retrieve an ephemeral authenticator from a local memory, for example from a volatile memory. It shall be appreciated that use of an agent and/or a memory provided at the client hosts is not necessary in all implementations.

The client hosts 10 is also shown to comprise a SSH client entity 12 adapted for communication with other SSH entities. A SSH Client entity can comprise a Secure Shell (SSH) client program, or Secure File Transfer (SFTP) client program, or any other similar program arranged to use SSH protocol. The SSH Agent entity 13 can comprise a SSH agent program providing authentication services for the SSH client program 12. Client Process entity 14 can be e.g. an application client process. More specific examples of client processes comprise automation scripts, file transfer commands, database backup scripts, etc. The client host apparatus 10 is further shown to comprise a single sign-on (SSO) Agent entity 15. The SSO agent entity can be provided, e.g., for authenticating machine-to-machine (M2M) client programs for the credential manager, e.g., the certificate authority (CA) server 30 of FIG. 1. A SSO Agent can run on a separate (administrator) account and is arranged to have a trust relationship with the credential manager server 30.

According to an aspect an emergency authentication procedure can be provided by means of emergency credentials, for example an emergency certificate 36. An emergency credential can be used, for example, for Internet of Things (IoT) applications in a system normally using one time or short lifetime credentials such as short lifetime certificates for access. An example of such access authentication system is PrivX™ provided by SSH Communications Security Oyj. With PrivX™, a user can authenticate to a gateway using Active Directory credentials, two-factor authentication, or single sign-on. The gateway is arranged to issue short-lives certificates to the user based on policy rules. The certificates can then be used to access accounts on target servers. Passwords can be eliminated from servers and there is no need for password vaults or password rotation. However, when an error condition occurs, it may not be possible to obtain a short lifetime credential or a differently limited credential from the security authority. Thus authentication might not be possible at all times. However, the target host may require an authentication even in such circumstances.

The following describes examples of emergency authentication in such situation. The described principles can be used, for example, for IoT applications in systems using one time or short lifetime credentials/certificates. When an error condition such as Certificate Authority (CA) error or link error occurs, a short lifetime certificate cannot be created, or at least provided for an entity needing it, and the normal authentication using such on demand certificates cannot be used. However, the IoT device may require some control even in this case to prevent e.g. the process controlled by the system from going to an unstable state.

An emergency security credential 36 can be provided to the client host 10 and stored therein such that it is available for authentication is situations where new certificate, or another credential, cannot be obtained from the trusted authority 30. In FIG. 1 dashed line 38 denotes a situation where the client cannot send a normal certificate 35 to the target host 20. Instead, an emergency certificate 36 received from the security authority server 30 can be stored e.g. in a SSH (Secure Shell) Client or locally elsewhere in the client host is sent, as indicated by line 39, to the target host. According to possibility the emergency certificate is stored in a vault, a secure storage hosts or the like secure external storage.

A normal authentication credential 35 issued by a security authority for use by a client host for accessing a target host in a data communication system can comprise at least one security feature for use in an authentication procedure between the client host 10 and the target host 20. In addition to said security feature, the emergency credential 36 comprises an indication 37 that the security credential is an emergency state security credential used in response to detection of an error situation preventing the client host from obtaining a security credential from the security authority.

The emergency certificate 36 can be used to access the target host in an error situation. Upon receiving the emergency certificate the target host 20 can detect the indication 37 that it has been used because of a detected error condition, and determine that the emergency certificate 36, rather than a "normal" certificate 35 has been send in response to a detected failure of obtaining the "normal" certificate from the security authority server.

In response to such determination, the target host can be configured to check the status of the relevant certificate authority (CA). The target host 20 can be configured such that it accepts the emergency certificate only after determining that the CA server 30 indeed cannot be reached by the client host 10. Further security measures such a password authentication or two factor authentication may be required in this state. Further, a special auditing for the relevant connection(s) may be performed at an audit log 40. The operations allowed for the client host may also be limited to a subset of operations that would be allowed in normal operation. For example, only operations absolutely required to prevent hazardous or economically intolerable situations from occurring may be allowed.

Emergency credentials 36 can be provided by the same security credential server 30 as the normal credentials 35. The emergency credentials can be stored in a local storage 18 provided in the client host 10 such that they can be used to access the target host 20 in response to a detected error situation.

The security credential can be stored at the client host into a restricted storage, such as a storage location owned by the root user or other privileged user. The emergency credentials can be stored at a location at the client host such they are accessible by only by the privileged used with appropriate access rights. For example, in machine to machine application normal machine to machine users are not able to access such locations, this providing an additional restriction on reading and leaking the privileged credentials. This can be arranged to improve security, and the emergency credential system can be configured operate only on the basis of privileged access rights on the client. Privileged access can be used to make it difficult for the hackers to access the credentials. Hosts involved in the system can operate based on the policy that storage in the client host can be trusted because only limited access on clients and servers is allowed. A secure external storage, for example in a secure server and/or in a cloud server may also be used for the storage.

The target host may check the status of the CA server, and accept the emergency certificate stored and or for the client host only when it has confirmed that the CA cannot be reached by the client.

The emergency certificate 36 may comprise an additional authentication credential that has longer lifetime than the normal authentication certificate 35. If the CA 30 is down, or cannot be reached e.g. because of network outage, the system can use the emergency certificate and continue the business or otherwise critical operation.

In case of, e.g., a SSH server, the target server 20 can be allowed to accept the emergency certificate 36 always when presented, assuming that it is still valid and has correct usage attributes. The target server syslog/SIEM systems can be configured so that the use of the emergency certificate is detected and in response to the detection an alert is generated. According to a possible arrangement, if the client side credentials have been leaked, their usage will generate a critical alert from the server side when used. The alert can be arranged to trigger a response from the CA server that it is up and running normally, thus exposing the incorrect usage of the emergency certificate. A check that the CA server 30 is down and acceptance of the emergency certificate only on those circumstances can be configured to be a protocol extension that can be implemented in the target host server 20.

The emergency credential such as the certificate 36 can be attributed/tagged by an appropriate indication 37 so that its use is distinguishable from the normal authentication credentials such as the certificate 35 by the target host server 20. The tagging can be done by a credential authority server, for example the CA server 30 of FIG. 1.

For example, emergency certificates can be configured to contain special attributes which notify the target server of a determined emergency state. The indications can trigger various actions to be taken by the target server host, for example alerts from the target server host. The indications can be explicit tags or they can be enrolled from a separate emergency CA.

When the tagging authority is the same as the one who provides the credentials for access the tagging can be trusted by the target host as it already trusts the authority to provide access credentials. If another authority is used for the tagging, then another trust relationship shall be provided.

Target servers may not require any additional configuration in certificate based approach besides the configuration of trusted CAs, and rules for action taken in response to determining emergency certificates.

A password authentication, two factor or multifactor authentication and/or human intervention may be required in case of authentication when in emergency state. Further, a special auditing at audit log 40 for the requested connection may be performed. The use of the emergency mode is detected at the client and the server side, and can be configured to always create a critical audit event. Target server configurations can be configured to be "static" and no per-key or per-certificate changes may be needed on the server side. The operations allowed for the client may be limited to a subset of operations allowed in the normal operation, e.g. to operations required to prevent hazards.

A policy can be configured limiting the use of emergency certificates only for the most business critical applications and/or machine-to-machine cases where the additional dependency of the security authority could decrease the system reliability. For example, a client host can be configured to limit the use of an emergency credential to, e.g., core bank transaction processing where even the shortest system outage has the potential of causing severe financial or other damages.

Emergency key and certificate management can be automated and made part of the normal mode of operation. For example, emergency credentials stored for the client can be replaced, renewed, rotated etc. on regular intervals by the security authority server. An example of delivery of emergency credentials is given with reference to FIG. 6.

Figure 2:
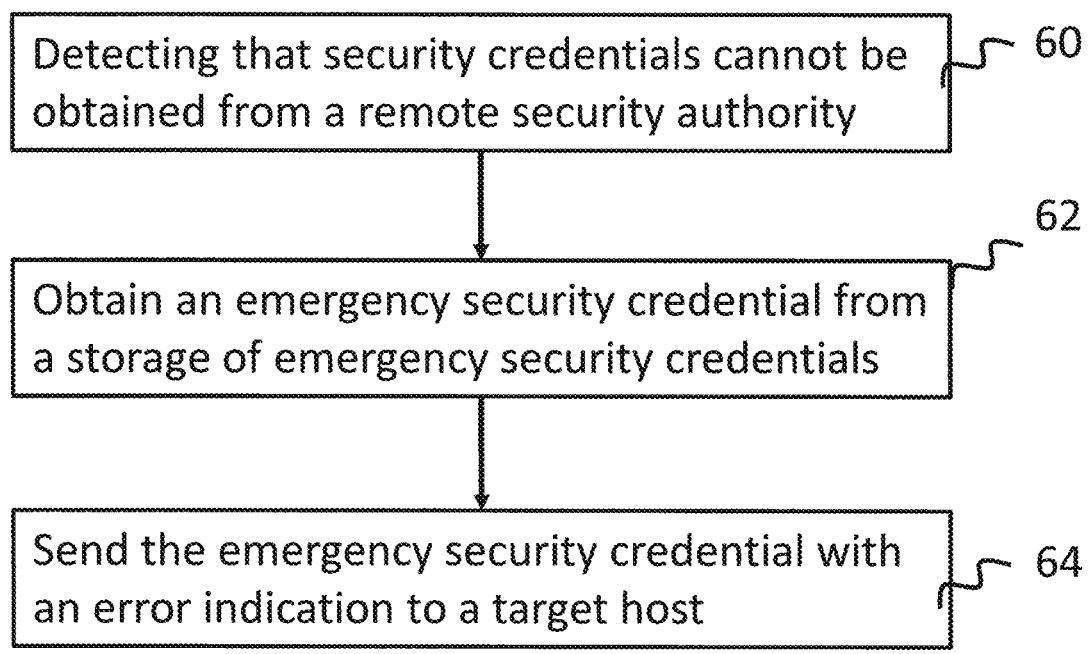
FIGS. 2 to 5 show flowcharts in accordance with certain aspects.

FIG. 2 is a flowchart for operation at a client host for authentication in a computer network system based on security credentials issued for client hosts by a remote security authority. In the method it is detected at 60 that a client host is prevented from obtaining security credentials from the remote security authority for use in accessing a target host. At 62, in response to said detecting, the client host obtains an emergency security credential from a storage of emergency security credentials. The emergency security credential is then sent at 64 with an error state indication from the client host to the target host. The error indication may be for example an attribute contained in the security credential.

The emergency security credential may comprise a security certificate issued by a certificate authority server. At least one of the security certificate and the emergency security certificate may comprise an ephemeral security certificate.

Figure 3:
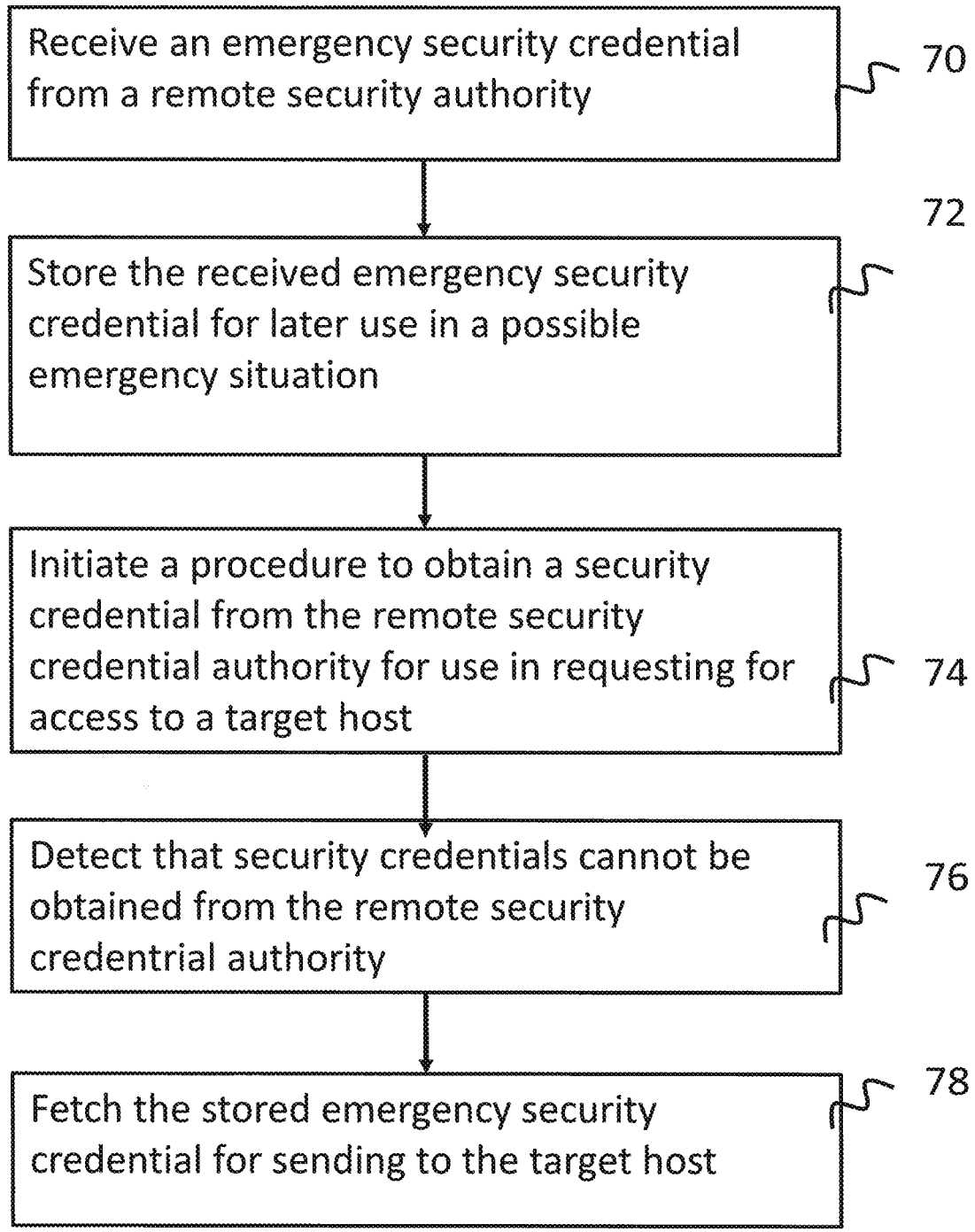

FIG. 3 shows a method for providing the client host with an emergency credential. The emergency security credential is received at 70 at the client host from the security authority, and thereafter store at 72 in a storage that is separate from the security authority for use later in response to detection that the client host is prevented from obtaining security credentials from the remote security authority. A procedure to obtain a security credential from the security authority for use in accessing the target host is initiated at 74. However, it is determined at 76 that security credentials cannot be obtained from the security authority. In response thereto the stored emergency security credential is fetched at 78 from the storage for sending to the target host.

Receiving and storing of emergency security credentials at a client host can be provided periodically. New emergency credential(s) may also be provided whenever a normal certificate is issued for the client host. The client host may request for a new emergency security credential from the security authority. The emergency security credential may be stored in a storage location at the client host which is only accessible by privileged, or root users. The emergency certificate may be used only for authentication of a limited set of operations.

Figure 4:
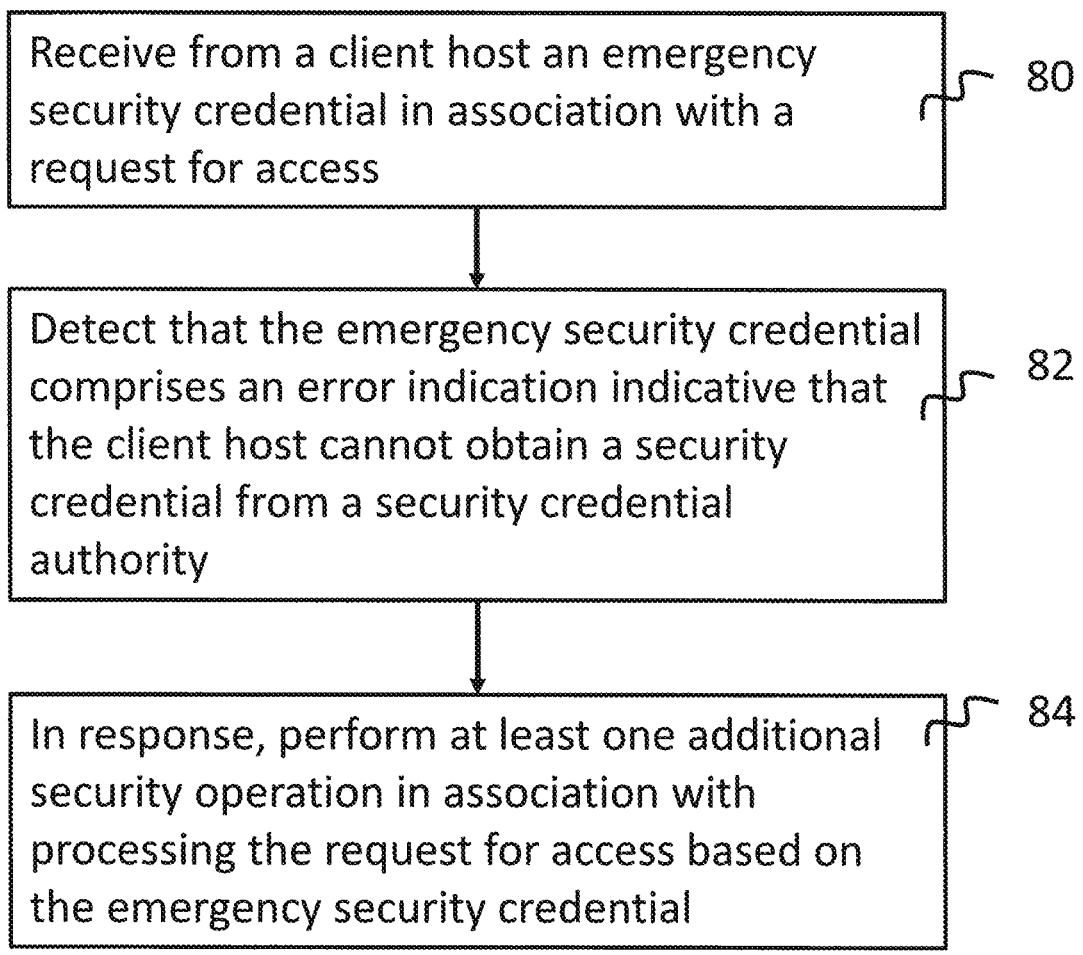

FIG. 4 shows operation at the target host for the method of authenticating access based on security credentials issued for a client host by a security authority. In the method the target host receives at 80 from the client host an emergency security credential in association with a request for access. It is detected at 82 that the received emergency credential contains an error state indication indicative that the client host is prevented from obtaining a security credential from the security authority for use in accessing the target host. In response to said detecting, at least one additional security operation is performed at 84 in association with processing the request for access based on the emergency security credential.

The at least one additional security operation comprises requesting for password authentication.

Figure 5:
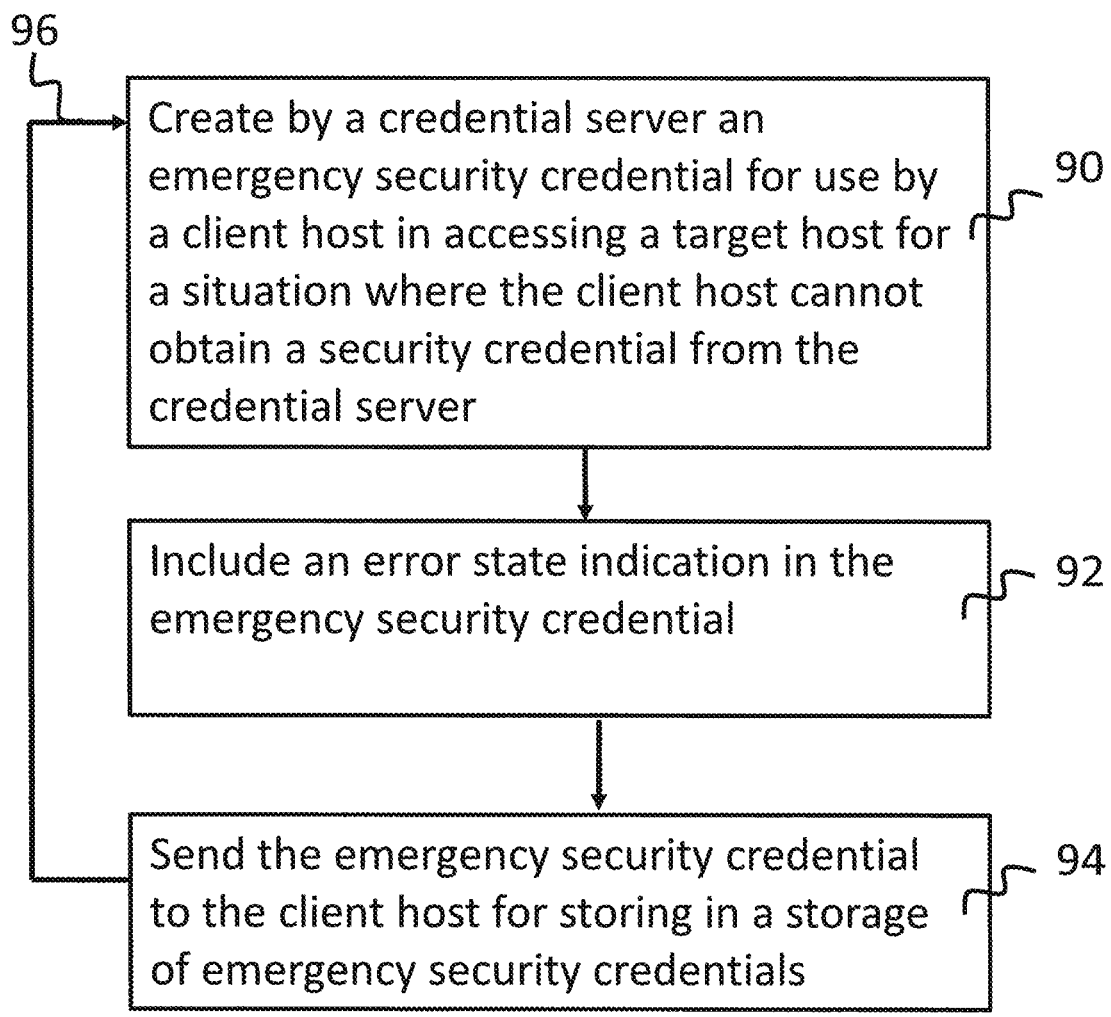

FIG. 5 shows a method for issuing security credentials and emergency security credential by a security credential server for access authentication in a computer network. At step 90 an emergency security credential is created for use by a client host in accessing a target host when the client host cannot obtain a security credential from the security credential server. The creation of the emergency security credential comprises generation 92 of the credential such that it comprises an error state indication. The emergency security credential is then sent at 94 to the client host for storing in a storage of emergency security credentials.

The process can be repeated to maintain a stored valid emergency credential at the client host, as indicated by loop 96. The repeat can be periodic, provided whenever a new credential is otherwise provided, and/or be based on a request from the client host.

Figure 6:
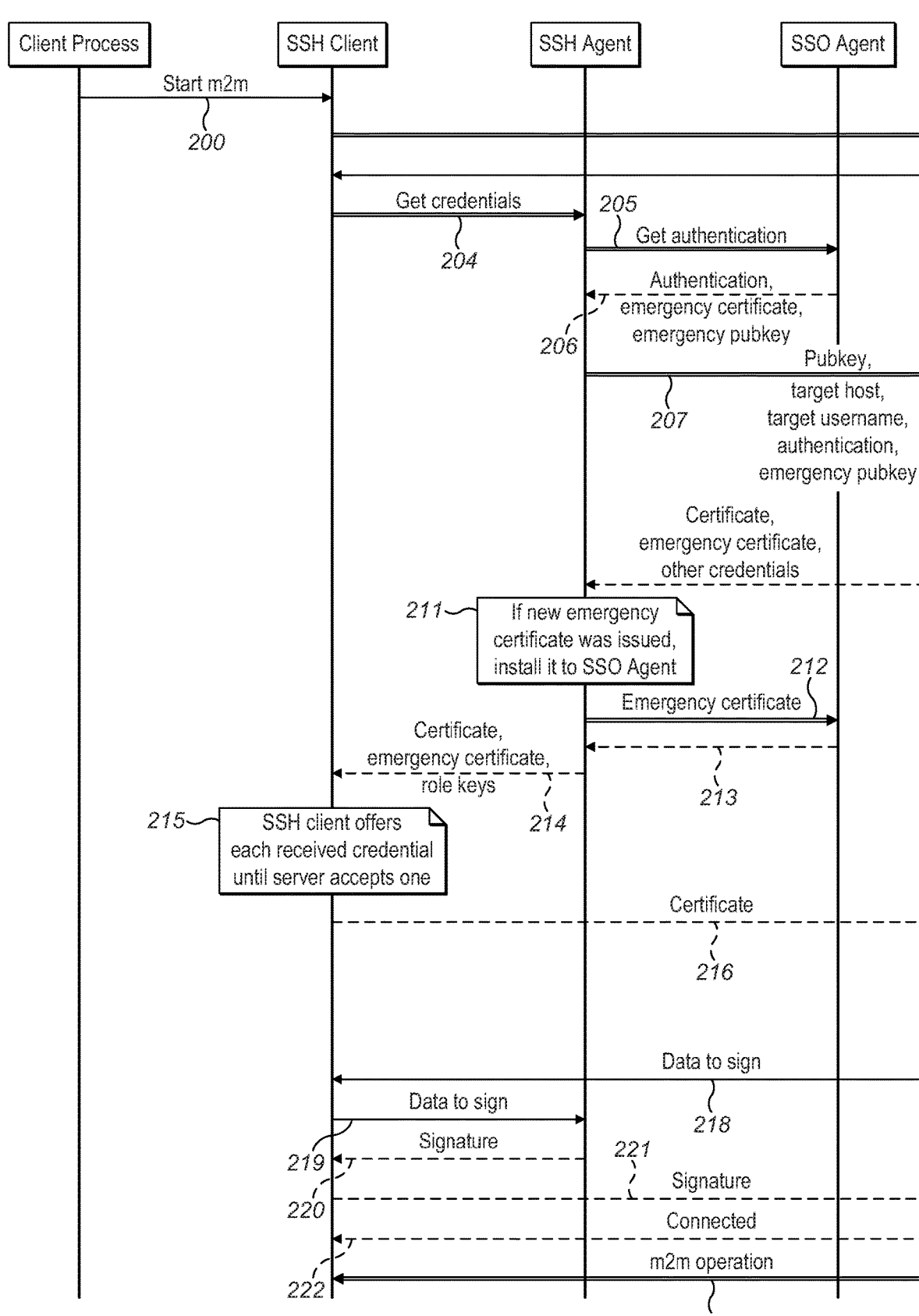
FIGS. 6 and 7 show signalling flowchart for certain modes of operation.
Figure 6:
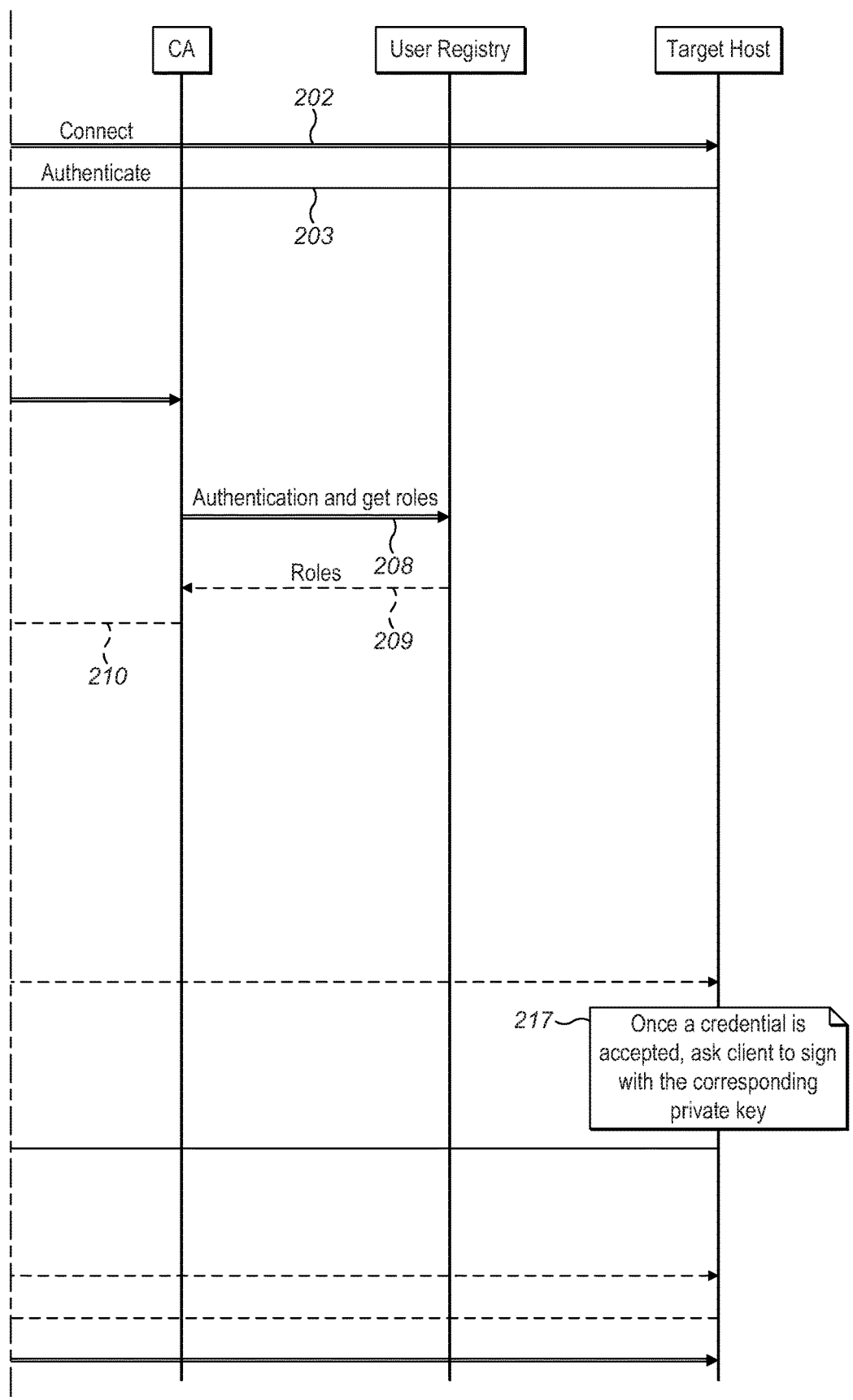

FIG. 6 shows a signaling flow chart for a more detailed example of a normal operation mode for machine-to-machine (M2M) operations. A client process starts machine-to-machine operations by a start command 200. In response a SSH Client starts Secure Shell protocol connection establishment procedure with a target server by connect message 202. The target server can then start authentication procedure with the SSH client by message 203. The SSH Client calls by message 204 an SSH Agent to get authentication credentials. The SSH Agent then calls by message 205 an SSO Agent to authenticate its CA message. Authentication is received by message 206 from the SSO Agent. Message 207 to the CA contains the SSH Agent's ephemeral public key which is either created on-demand for the current operation, or has been previously created.

The SSO Agent resolves the user identity of the Client Process starting the machine-to-machine operation and signs the SSH Agent's CA call by message 206. The SSO Agent may also include its emergency keypair's public key to the signed SSH Agent CA call message. This can be used to implement emergency certificate renewal at configured renewal intervals. The SSO Agent returns by message 206 the signed message and the current emergency certificate to the SSH Agent. The SSH Agent can now send the signed message 207 to the CA.

CA receives and verifies the message by authentication through exchange of messages 208, 209 with a user registry. The CA issues a certificate containing user's roles at 210. The CA may also issue at this stage an emergency certificate if the emergency public key was included in the message.

The SSH Agent can now call by message 212 the SSO Agent to install the emergency certificate in response to determination at 211 that such was included in the response 210. The installation can be acknowledged by message 213.

The SSH Agent can then return in message 214 the authentication credentials to the SSH Client. This message can also include the current or the renewed emergency certificate. The emergency certificate can be stored by the SSH client, and the "normal certificate used for authentication. The SSH Client is thus now in state 215 where it can offer the received credential to the target host until one is accepted, and where it also is in possession of a fresh emergency credential.

The SSH Client can authenticate the connection with the provided credentials by sending message 216 to the target host. If the target host accepts at 217 the credential it asks by message 218 the SSH client to sign data using corresponding private key. The SSH Client forwards the data to the SSH agent by message 219 and receives signature back in message 220. The signature is sent by message 221 to the target host which can then confirm the connected status by message 222. The machine-to-machine operation can then be established at 223.

Figure 7:
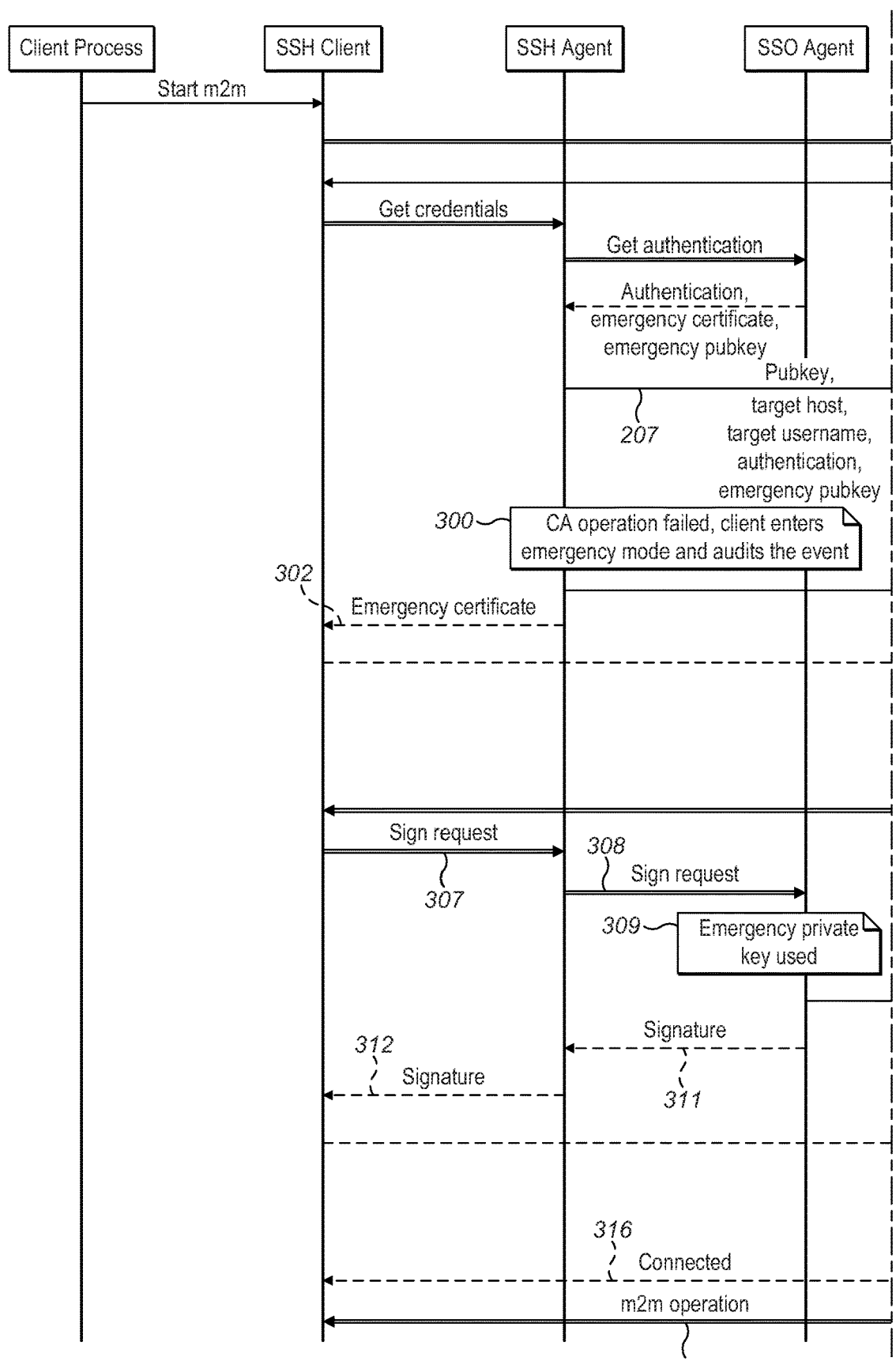
Figure 7:
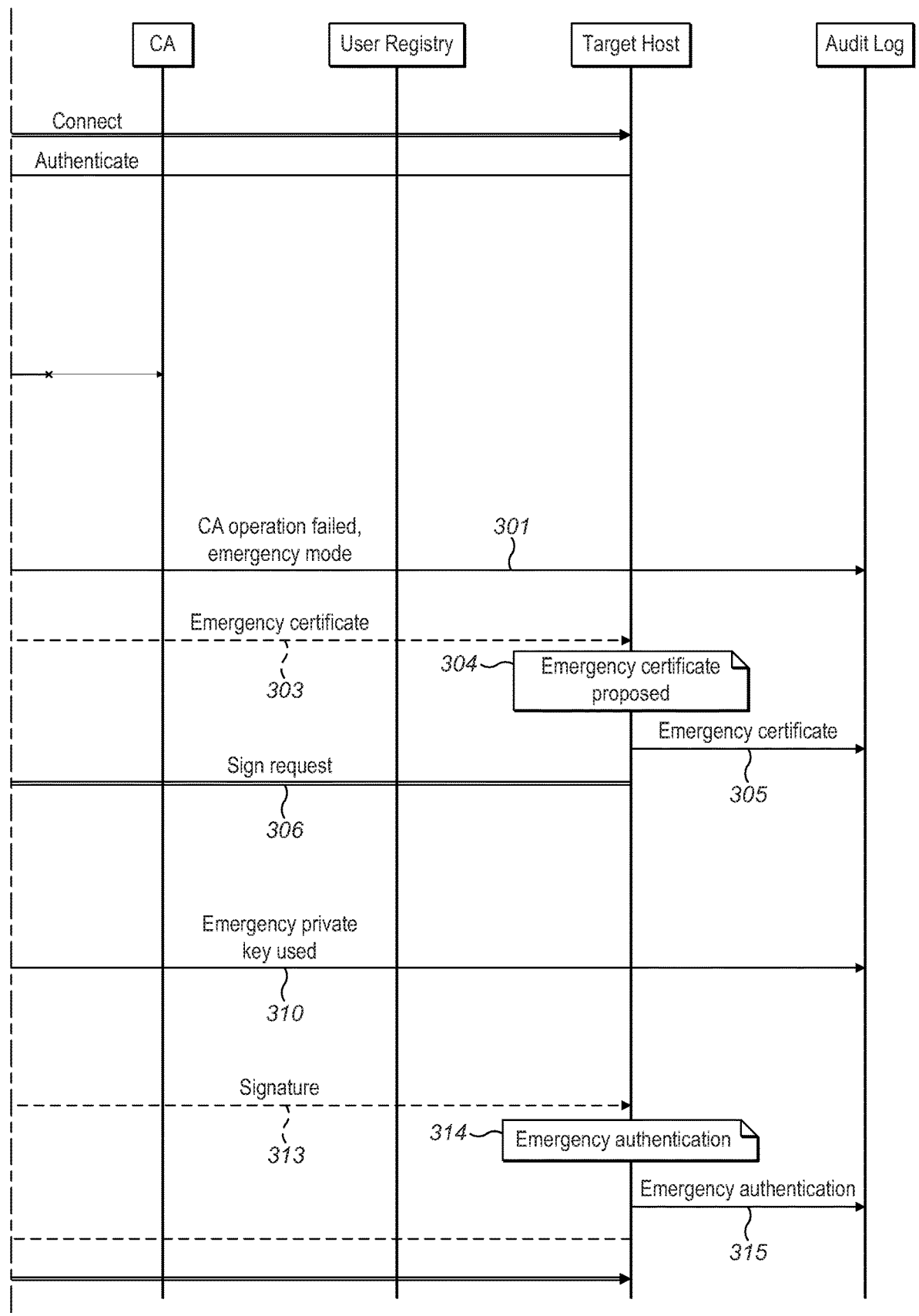

FIG. 7 illustrates a signaling flowchart for an example operation according to a possible emergency operation mode. The operation can be similar to the normal operation mode a explained above until the SSH Agent tries to connect to the CA at 207 and it is determined at 300 that the CA operation fails. The failure can be, e.g., because of a network connection problem, CA failure, etc. The SSH Agent can in response enter the emergency operation mode. According to an aspect the event is audited by sending an appropriate message 301 to a host providing an audit log.

Because of the error in contacting the CA the SSH Agent cannot create a new authentication certificate. To respond this situation the SSH agent can fetch and return an emergency certificate to the SSH Client by message 302.

The SSH Client can then use the emergency certificate in the authentication, by sending it in message 303 to the target host. The target host detects at 304 from an indication in the certificate that an emergency certificate rather than a normal certificate is used for the authentication. In response thereto the target host sends by message 305 the emergency certificate to the audit log to audit the event.

If the emergency certificate is accepted by the target host, message 306 is sent to request for a sign operation from the SSH Client. The SSH Client sends in 307 the sign request to SSH Agent which detects that the sign request associates with the emergency certificate. SSH Client delegates at 308 the sign operation to the SSO Agent which uses at 309 the emergency keypair's private key for the sign operation. The event is audited by message 310. The signature is returned by message 311 to SSH Agent, further by message 312 to the SSH Client, and then by message 313 to the target host.

The target host then verifies at 314 the signature. If the signature matches, the target host accepts the authentication. The target hosts also audits the event of use of an emergency certificate for authentication by sending message 315 to the audit log.

The target host can then confirm the connected status by message 316. The machine-to-machine operation can be established at 317.

It is noted that although the above example is explained with reference to a Secure Shell (SSH) protocol based environment, similar principles can be applied to other systems as well where authentication using one off or short time certificates is required.

The emergency keypair and the associated emergency certificate can be used to provide a secondary way of authenticating the user and/or client process to a target host. An SSO Agent can be configured to run on a privileged mode. In the privileged mode all its assets (configuration files, program binaries, keys etc.) are only accessible by a privileged user. The emergency keypair and emergency certificate may be saved on a non-volatile storage so that if the client host is restarted, and after the restart the CA is unreachable, the client can still authenticate in order to execute business critical operation with the target host. The arrangement can be such that an emergency keypair itself does not provide any access to the target host. Rather, the target host authentication is done with the emergency certificate which has been issued for the emergency keypair's public key. The emergency keypair itself is thus not critical for the system security as it is of no use without a corresponding valid emergency certificate.

The emergency certificate can be made distinguishable from the normal authentication certificate so that entities processing it can determine the operation being in emergency mode. Thus, if an emergency certificate is used in authentication, the emergency mode is detected and a custom high priority auditing rules can be configured to audit the event. Additional audit rules may be configured to detect the use of the emergency certificate in authentication. The emergency certificate usage may be detected and audited from both client and server side. Other rules and restrictions may also be applied in emergency mode. An emergency certificate can also have additional constraints (source location restrictions, command limitations, etc.) to narrow the emergency mode's operation to bare minimum.

The emergency certificate enrollment and renewal can be arranged to occur together with the normal authentication flow so that as long as the normal operation mode is used, the emergency keypair can be renewed (based on the configured renewal intervals), and the emergency certificate can be updated. This means that normal key rotation process restrictions and guidelines can be applied without need of any additional renewal processes.

Emergency certificate can have rather limited validity time thus limiting the potential risk of leaking the emergency keys and certificates. The emergency certificate can be arranged to have long enough lifetime so that critical machine-to-machine operations can be continued while the CA operation is interrupted.

An emergency certificate may otherwise have the same role-based access constraints as normal authentication certificates. Roles can be updated from the CA and the user registry. New roles can be applied as soon as the emergency certificate has been renewed. This can be a configurable feature.

Figure 8:
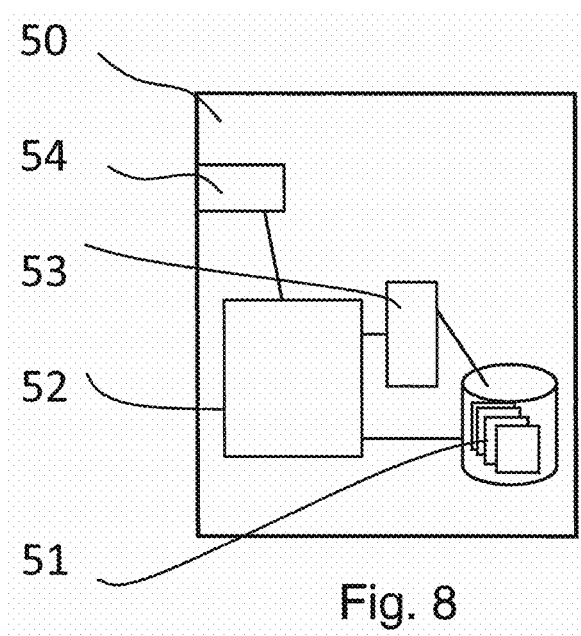
FIG. 8 shows data processing apparatus.

FIG. 8 shows an example of data processing apparatus for providing necessary data processing functions to implement the above described functions and processing of the emergency certificates. The data processing apparatus 50 can be for example integrated with, coupled to and/or otherwise arranged for controlling the client host device 10, and/or target host 20, and/or certificate authority server 30 of FIG. 1. The data processing apparatus can also be provided for implementing any of the agents in FIG. 1. The data processing apparatus 50 can be further arranged to provide control on communication sessions and any additional information. In addition to the functions described above, the control apparatus can be configured to provide control functions in association with operations such as decryption of data, signalling and data communication operations. A data processing apparatus can determine which key(s) or other authenticators and credentials are needed for the access and other control operations. For these purposes the control apparatus comprises at least one memory 51, at least one data processing unit 52, 53 and at least one input/output interface 54. Via the interface the apparatus can be coupled to other entities of the respective device. The control apparatus can be configured to execute an appropriate software code to provide the control functions. The control apparatus can also be interconnected with other control entities. Means for providing an intermediate security function in a computer network between hosts and devices capable of accessing the hosts can comprise an appropriate data processing and interface arrangement.

The various embodiments and their combinations or subdivisions may be implemented as methods, apparatuses, or computer program products. According to an aspect at least some of the functionalities are provided in virtualised environment. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. At least some of the processing and/or hosts can be provided in virtualised environment.

A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in various combinations in, as non-limiting examples, hardware, software, firmware, special purpose circuits or logic, general purpose hardware or controller or other computing devices, or some combination thereof.

A centralized and scalable access management solution may be provided for elastic cloud environments. Access right updates can be made instantaneously. Per-host changes may not be required. Certain aspects support both interactive and non-interactive (machine-to-machine) connections.

The various aspects and features discussed above can be combined in manners not specifically shown by the drawings and/or described above.

The foregoing description provides by way of exemplary and non-limiting examples a full and informative description of exemplary embodiments and aspects of the invention. However, various modifications and adaptations falling within the spirit and scope of this disclosure may become apparent to those skilled in the relevant arts in view of the foregoing description, when read in conjunction with the accompanying drawings and the appended claims.

The invention claimed is:

1. A method for authentication in a computer network system based on security credentials issued for client hosts by a remote security authority, the method comprising:

receiving, by a client host from the remote security authority, an emergency security credential and storing the received emergency security credential in a storage of emergency security credentials for use later in response to detection that the client host is prevented from obtaining security credentials from the remote security authority, wherein use of the emergency security credential is limited to authentication of a limited set of operations for the client host, the receiving comprising at least one of:

periodic receiving and storing of the emergency security credential, requesting for a new emergency security credential from the security authority, and receiving a new emergency security credential in the course of normal delivery of security credentials from the security authority, initiating a procedure to obtain a security credential from the security authority for use in accessing the target host, detecting that the client host is prevented from obtaining security credentials from the remote security authority for use in accessing a target host, in response to said detecting, fetching by the client host the previously stored emergency security credential from the storage of emergency security credentials, and sending the emergency security credential with an error state indication from the client host to the target host.

2. The method according to claim 1, wherein the emergency security credential received from the remote security authority includes the error state indication.

3. The method according to claim 1, wherein the emergency security credential comprises a security certificate issued by a certificate authority server.

4. The method according to claim 1, wherein at least one of a security certificate issued by a certificate authority server and the emergency security credential comprises an ephemeral security certificate.

5. The method according to claim 1, comprising at least one of storing the emergency security credential in a storage at the client host that is accessible only by holders of privileged access rights, and using the emergency security credential for authentication of machine-to-machine communications.

6. A method for authenticating access to a target host in a computer network based on security credentials issued for a client host by a security authority, the method comprising:

receiving at the target host from the client host an emergency security credential in association with a request for access, wherein use of the emergency security credential is limited to authentication of a limited set of operations for the client host, wherein the client host has at least one of:

periodically received and stored the emergency security credential, requested earlier for the emergency security credential from the security authority, or received the emergency security credential in the course of normal delivery of security credentials from the security authority, and wherein the client host has initiated a procedure to obtain a security credential from the security authority for use in accessing the target host but is prevented from obtaining a security credential from the remote security authority, detecting an error indication in the received emergency credential indicative that the client host is prevented from obtaining a security credential from the remote security authority for use in accessing the target host, and in response to said detecting, performing at least one additional security operation in association with processing the request for access based on the emergency security credential and limiting the operations allowed for the client host in response to the request for access based on the limited use of the emergency security credential for authentication of the limited set of operations.

7. The method according to claim 6, wherein performing the at least one additional security operation comprises at least one of:

requesting for password authentication, requesting for two factor authentication, auditing of the access request, causing sending an alert message, and checking the status of the security authority.

8. A data processing apparatus for a client host use for authentication in a computer network system based on security credentials issued by a remote security authority, the data processing apparatus comprising at least one processor, and at least one memory including computer program code, wherein the at least one memory and the computer program code are configured, with the at least one processor, to cause the client host to:

receive an emergency security credential from the remote security authority and store the received emergency security credential in a storage of emergency security credentials for use later in response to detection that the client host is prevented from obtaining security credentials from the remote security authority, wherein use of the emergency security credential is limited to authentication of a limited set of operations for the client host, the receiving comprising at least one of:

periodic receiving and storing of the emergency security credential, requesting for a new emergency security credential from the security authority, and receiving a new emergency security credential in the course of normal delivery of security credentials from the security authority, initiate a procedure to obtain a security credential from the security authority for use in accessing the target host, detect that the client host is prevented from obtaining security credentials from the remote security authority for use in accessing a target host, in response to said detecting, fetch the previously stored emergency security credential from the storage of emergency security credentials, and send the emergency security credential with an error state indication to the target host.

9. The apparatus according to claim 8, configured to at least one of:

receive the emergency security credential provided with the error state indication from the remote security authority and store the received emergency security credential at the client host; and store the emergency security credential in a storage at the client host that is accessible only by holders of privileged access rights.

10. The apparatus according to claim 8, configured to use the emergency security credential for authentication of machine-to-machine communications.

11. A data processing apparatus for a target host for use in authentication of clients hosts in a computer network system based on security credentials issued by a remote security authority, the data processing apparatus comprising at least one processor, and at least one memory including computer program code, wherein the at least one memory and the computer program code are configured, with the at least one processor, to cause the target host to:

receive from a client host an emergency security credential in association with a request for access, wherein use of the emergency security credential is limited to authentication of a limited set of operations for the client host, wherein the client host has at least one of:

periodically received and stored the emergency security credential, requested earlier for the emergency security credential from the security authority, or received the emergency security credential in the course of normal delivery of security credentials from the security authority, and wherein the client host has initiated a procedure to obtain a security credential from the security authority for use in accessing the target host but is prevented from obtaining a security credential from the remote security authority, detect an error indication in the received emergency credential indicative that the client host is prevented from obtaining a security credential from the remote security authority for use in accessing the target host, and in response to said detecting, perform at least one additional security operation in association with processing the request for access based on the emergency security credential and limit the operations allowed for the client host in response to the request for access based on the limited use of the emergency security credential for authentication of the limited set of operations.

12. The apparatus according to claim 11, configured to, in response to detection of the error indication, at least one of: request for password authentication, request for two factor authentication, cause auditing of the access request cause sending an alert message, and check the status of the security authority.

\* \* \* \* \*